(12) United States Patent
Rabal

(10) Patent No.: US 8,350,502 B2
(45) Date of Patent: Jan. 8, 2013

(54) ELECTROMAGNETIC MOTOR

(76) Inventor: Clifford R. Rabal, Wills Point, TX (US)

( * ) Notice: Subject to any disclaimer, the term of this patent is extended or adjusted under 35 U.S.C. 154(b) by 597 days.

(21) Appl. No.: 12/500,455

(22) Filed: Jul. 9, 2009

(65) Prior Publication Data

US 2012/0013276 A1 Jan. 19, 2012

(51) Int. Cl.
*H02K 29/00* (2006.01)
(52) U.S. Cl. ........ 318/140; 318/139; 318/450; 318/454; 310/113; 310/27; 310/152; 310/153; 310/154.02; 310/154.05; 310/154.06; 322/14; 322/17; 322/42; 322/43; 322/44; 322/46
(58) Field of Classification Search ............. 318/400.01, 318/400.07, 400.09, 400.14, 400.39, 400.4, 318/703, 139, 140, 450, 454; 310/36, 103, 310/152, 113, 156.32, 46, 181, 27, 153, 154.02, 310/154.05, 154.06; 322/14, 17, 42, 43, 322/44, 46
See application file for complete search history.

(56) References Cited

U.S. PATENT DOCUMENTS

| | | | | |
|---|---|---|---|---|
| 1,373,621 A * | 4/1921 | Lincoln | ........................ | 320/157 |
| 1,724,446 A | 8/1929 | Worthington | | |
| 1,859,643 A | 5/1932 | Worthington | | |
| 1,863,294 A | 6/1932 | Bogia | | |
| 3,670,189 A | 6/1972 | Monroe | | |
| 3,703,653 A | 11/1972 | Tracy | | |
| 3,890,548 A | 6/1975 | Gray | | |
| 4,025,831 A * | 5/1977 | Webb | ........................ | 318/400.41 |
| 4,595,390 A * | 6/1986 | Hakim et al. | ........................ | 604/9 |
| 4,864,199 A * | 9/1989 | Dixon | ........................ | 318/400.09 |
| 5,428,282 A * | 6/1995 | Johnson | ........................ | 318/701 |
| 5,514,923 A * | 5/1996 | Gossler et al. | ........................ | 310/74 |
| 6,120,537 A * | 9/2000 | Wampler | ........................ | 623/3.14 |
| 6,246,146 B1 * | 6/2001 | Schiller | ........................ | 310/268 |
| 6,280,157 B1 * | 8/2001 | Cooper | ........................ | 417/423.7 |
| 6,720,688 B1 * | 4/2004 | Schiller | ........................ | 310/64 |
| 6,759,775 B2 * | 7/2004 | Grimm | ........................ | 310/156.23 |
| 6,936,994 B1 * | 8/2005 | Gimlan | ........................ | 320/101 |
| 2004/0090140 A1 * | 5/2004 | Lai et al. | ........................ | 310/268 |
| 2004/0263099 A1 * | 12/2004 | Maslov et al. | ........................ | 318/254 |
| 2006/0238055 A1 | 10/2006 | Danford | | |
| 2007/0188036 A1 * | 8/2007 | Shibukawa | ........................ | 310/113 |
| 2007/0222318 A1 | 9/2007 | Godfrey | | |
| 2007/0284956 A1 | 12/2007 | Petrovich | | |
| 2008/0024017 A1 | 1/2008 | Chen | | |
| 2008/0164778 A1 | 7/2008 | Schieffer | | |
| 2011/0320074 A1 * | 12/2011 | Erlston et al. | ........................ | 701/22 |

* cited by examiner

*Primary Examiner* — Rita Leykin
(74) *Attorney, Agent, or Firm* — Jack D. Stone, Jr.; Scheef & Stone, L.L.P.

(57) ABSTRACT

An electromagnetic motor having a frame, and at least one disc rotatably mounted to the frame. At least one permanent magnet is mounted on the disc, and at least one electromagnet is mounted to the frame in magnetic proximity to the at least one permanent magnet. A battery is electrically coupled to the motor for powering the at least one electromagnet. A switch controls electrical power between the battery and the at least one electromagnet, and a sensing means is provided for controlling the switch to activate the at least one electromagnet with respect to the at least one permanent magnet to cause the at least one disc to rotate. Preferably, a generator is mechanically coupled to the motor and electrically coupled to the battery for generating electrical power to the battery, and a renewable energy source such as a photovoltaic cell is electrically coupled to the motor to supplement any net electrical loss.

20 Claims, 3 Drawing Sheets

ELECTROMAGNETIC MOTOR

TECHNICAL FIELD

The invention relates generally to motors and, more particularly, to electromagnetic motors.

BACKGROUND

Conventional internal combustion engines for automobiles and other purposes require an oil-based fuel source that, once consumed, does not renew. Globally, easily obtainable sources of oil are dwindling. The sources that remain viable are located in areas of the world that are instable and often subject to extreme violence. In addition, industrialization of developing economies places additional demand on this dwindling resource. The combined effects of decreased supply, instability in producible regions, and increased global demand threatens to price the individual consumer of oil-based products out of the market over the long term.

Attempts to address this issue generally lead to the development of engines that do not consume oil-based fuel, such as those that use ethanol or bio-diesel. In addition, inventers have attempted to develop electromagnetic motors as replacements for modern internal combustion engines. An electromagnetic motor uses the attractive and repulsive forces of magnets to generate mechanical and electrical power. However, many electromagnetic motors are inefficient requiring significantly more energy to generate power levels comparable to that of a modern internal combustion engine, making these electromagnetic motors poor substitutes for the internal combustion engine.

Therefore, it would be desirable to have an efficient electromagnetic motor to provide an effective substitute to the modern internal combustion engine reducing the individual consumer's dependence on oil-based products.

SUMMARY

The present invention, accordingly, provides an electromagnetic motor having a frame, and at least one disc rotatably mounted to the frame. At least one permanent magnet is mounted on the at least one disc off-center from the at least one disc. At least one electromagnet is mounted to the frame in magnetic proximity to the at least one permanent magnet, and a battery is electrically coupled to the at least one electromagnet for powering the at least one electromagnet. A switch controls electrical power between the battery and the at least one electromagnet. A sensing means is provided for generating a signal to the switch to activate electrical power to the at least one electromagnet upon sensing when said at least one electromagnet is positioned with respect to the at least one permanent magnet such that a magnetic force generated by the electromagnet with respect to the permanent magnet would be effective for inducing rotation of the at least one disc.

The present invention also provides a method for generating mechanical power comprising the steps of providing a frame, and rotatably mounting at least one disc to the frame. The method continues by mounting at least one permanent magnet on the at least one disc off-center from the at least one disc and mounting at least one electromagnet to the frame in magnetic proximity to the at least one permanent magnet. Next, the method couples a battery to the at least one electromagnet, and provides a switch for controlling electrical power between the battery and the at least one electromagnet. The method also comprises providing a sensing means for generating a signal to the switch to activate electrical power to the at least one electromagnet upon sensing when the at least one electromagnet is positioned with respect to the at least one permanent magnet such that a magnetic force generated by the at least one electromagnet with respect to the at least one permanent magnet would be effective for inducing rotation of the at least one disc. The method concludes by activating the sensing means for controlling the switch causing the at least one electromagnet to exert a magnetic force on the at least one permanent magnet causing the at least one disc to rotate.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. Additionally, for the most part, details concerning electromagnets and the like have been omitted inasmuch as such details are not considered necessary to obtain a complete understanding of the present invention, and are considered to be within the skills of persons of ordinary skill in the relevant art.

Figure 1:
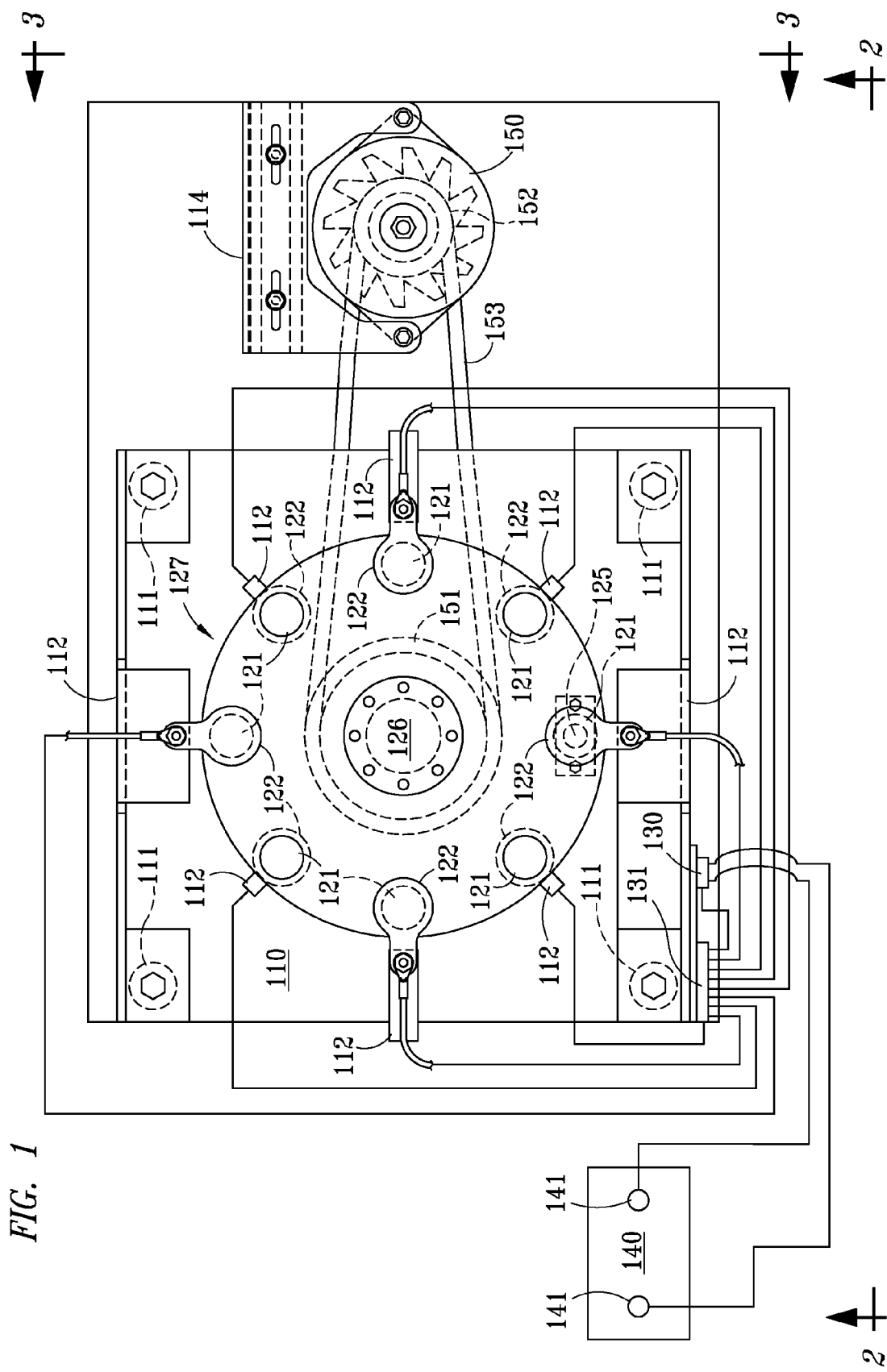
FIG. 1 is a plan view exemplifying components of an electromagnetic motor embodying features of the present invention.
Figure 2:
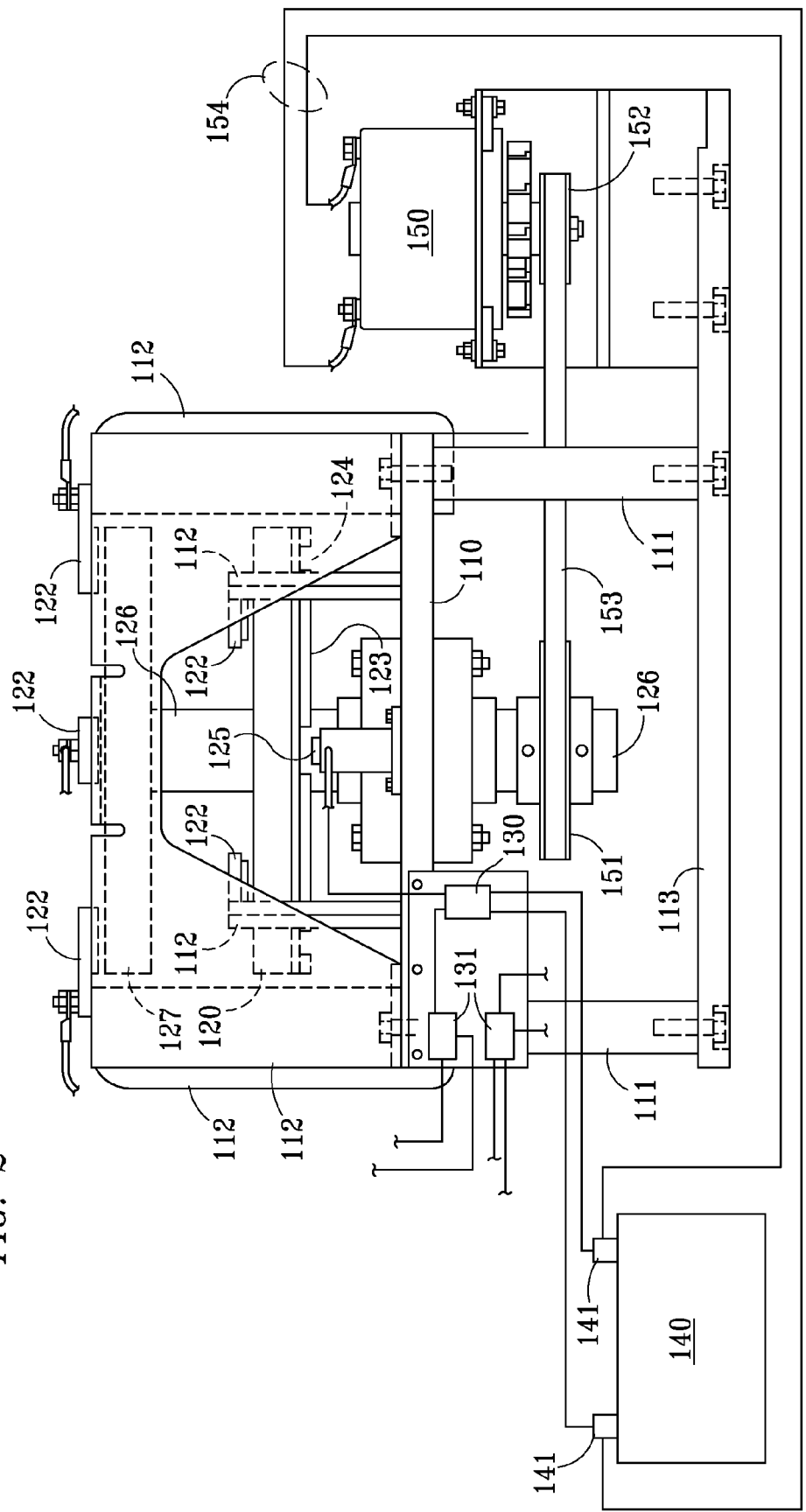
FIG. 2 is an elevation view of the electromagnetic motor of FIG. 1 taken along the line 2-2 of FIG. 1.
Figure 3:
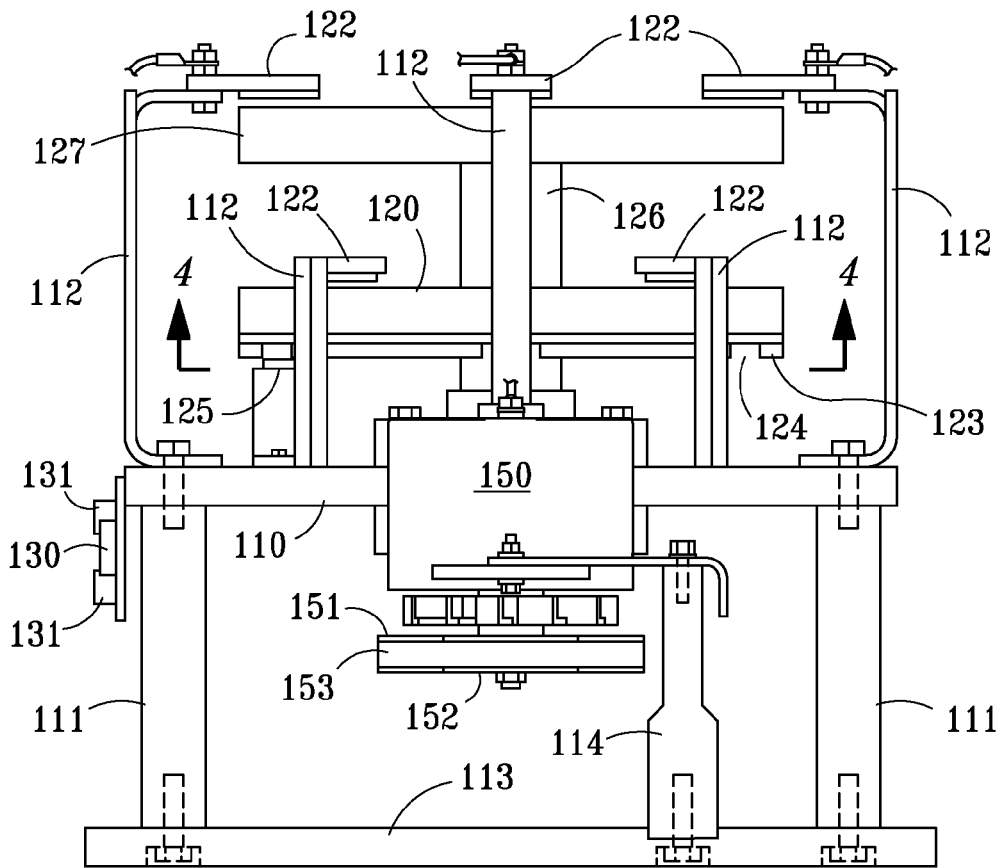
FIG. 3 is an elevation view of the electromagnetic motor of FIG. 1 taken along the line 3-3 of FIG. 1.

Referring to FIG. 1 of the drawings, a motor 100 comprises a frame 110 having two sides, a first disc 127, and a second disc 120 coupled together via a shaft 126. The first disc 127 and the second disc 120 are rotatably mounted on the shaft 126, and the shaft 126 is mounted on the frame 110 (FIGS. 2 and 3). In the preferred embodiment, the shaft 126 (FIGS. 2 and 3) is attached to the first disc 127 and the second disc 120 through an axis extending through a center of the first disc 127 and the second disc 120. In the illustrated embodiment, columns 111 (four of which are shown) support the frame 110 above a base plate 113, allowing the shaft 126 to extend from both sides of the frame 110. Preferably, the base plate 113 is larger than the frame 110 allowing the base plate 113 to support additional elements, such as a generator 150 supported above the base plate 113 by a generator support 155. A person of ordinary skill in the art will understand that the electromagnetic motor may be mounted in a variety of configurations and methods to suit the particular application for which the electromagnetic motor 100 is used. The illustrated embodiment is but one example of a configuration and is not intended to limit the invention in any manner. In addition, a variety of elements may be mounted to the base plate in addition to, or in place of the generator 150.

Figure 4:
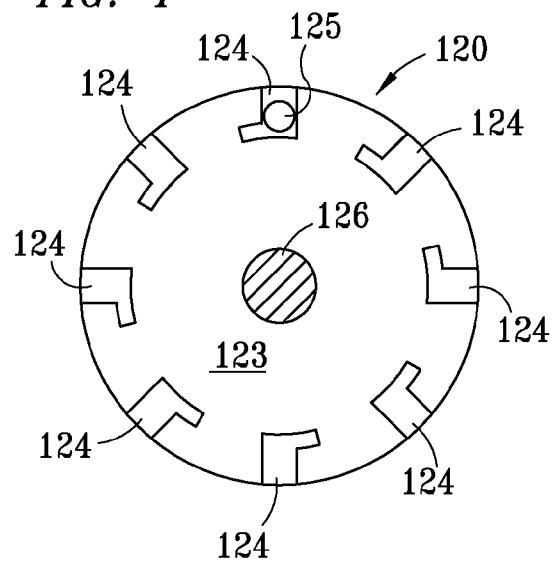
FIG. 4 exemplifies a firing ring utilized in the electromagnetic motor of FIG. 1 taken along the line 4-4 of FIG. 3.

As illustrated in FIG. 1, at least one "permanent" magnet 121 (eight of which are shown) is mounted on each of the first disc 127 and the second disc 120 proximate to an edge of the first disc 127 and the second disc 120. It is understood that, as used herein, the term "permanent" magnet refers to a magnet made from a material that stays magnetized without electricity, and the term "permanent" does not mean such a magnet could not lose its magnetism, for example, through exposure to heat, physical shock, or an opposing magnetic field. Additionally, in the preferred embodiment, the at least one permanent magnet 121 is recessed in a top (as viewed in FIGS. 2 and 3) surface of each of the first disc 127 and the second disc 120 such that a top surface of the at least one permanent magnet 121 is flush with the top surface of each of the first disc 127 and the second disc 120. Alternative embodiments of the invention may not recess the at least one permanent magnet 121, or may place the at least one permanent magnet 121 on a different surface of the first disc 127 and the second disc 120 to suit particular situations and uses of the motor 100 of the present invention. At least one electromagnet 122 (eight of which are shown) is mounted to the frame 110 by electromagnet (EM) support 112 (FIGS. 2 and 3) proximate to each of the first disc 127 and the second disc 120. In the preferred embodiment, four electromagnets 122 are placed proximate to the edge of the first disc 127, and four electromagnets 122 are placed proximate to the edge of the second disc 120. A battery 140 is electrically coupled through terminals 141 and power wiring 142 to a solid state relay 130 for powering the at least one electromagnet 122. The solid state relay 130 is configured to control electrical power between the battery 160 and the at least one electromagnet 122 via distributors 131 and a sensing means 125 (FIGS. 2, 3 and 4). By way of example, the sensing means 125 preferably comprises a mechanical switch, a photocell responsive to light reflected back from the disc or from a reflector inside the disc perceptible via holes in the disc, a proximity sensor effective for sensing a discontinuity in a disc, or the like. The sensing means 125 is effective for generating a signal to the solid state relay 130 to activate the at least one electromagnet 122 with respect to the at least one permanent magnet 121 causing the first disc 127 and the second disc 120 to rotate, as discussed in further detail below.

In the preferred embodiment, the generator 150 is mounted on the base plate 113. As best viewed in FIG. 2, a first pulley 151 is mounted on the shaft 126, and a second pulley 152 is mounted on the generator 150. The first pulley 151 and the second pulley 152 are coupled together via a belt 153. The pulley ratio between the first pulley 151 and the second pulley 152 is selected to maximize the electrical power generated by the generator 150. The generator 150 is electrically connected via electrical cables 154 to terminals 141 of the battery 140 allowing the generator 150 to charge the battery 140 during operation of the motor 100. Alternatively, the generator 150 may be coupled to the motor 100 via any suitable means, such as gears, drive shafts, and/or the like, well-known to those skilled in the art.

In one preferred embodiment, the sensing means 125 comprises a proximity sensor configured to detect a discontinuity in a firing ring 123, illustrated in FIG. 4. As illustrated, the firing ring 123 is positioned on a bottom surface of the second disc 120, but could as well be positioned on the top surface of the second disc 120 or on the first disc 127. The firing ring 123 is preferably notched creating openings 124 proximate to an edge of the firing ring 123. The openings 124 are coordinated with the placement of the at least one permanent magnet 121 in the top surface of disc 120 such that the sensing means 125 will activate or deactivate the at least one electromagnet 122 (FIG. 1) in response to openings 124. In the preferred embodiment, the firing ring 123 is coupled to the second disc 120 such that the activation of the at least one electromagnet 122 may be adjusted or tuned by mechanically turning the firing ring 123 in relation to the second disc 120. A person of ordinary skill in the art will understand that any appropriate means may be used to adjust the activation and deactivation of the at least one electromagnet 122. Additionally, use of a proximity sensor is but one way to coordinate the activation and deactivation of the at least one electromagnet 122 with respect to the at least one permanent magnet 121, any other appropriate means may be used. Preferably, the firing ring 123 and the means 125 coordinate the activation of the at least one electromagnet 122 proximate to each of the first disc 127 and the second disc 120. However, a person of ordinary skill in the art will recognize that the at least one electromagnet 122 proximate to first disc 127 and the at least one electromagnet 122 proximate to the second disc 120 may be coordinated using separate and additional firing rings 123 and sensing means 125.

Referring now to FIG. 2, in the side view of the motor 100, the shaft 126 may be seen coupled to the second disc 120. In addition, the shaft 126 may be seen coupled to the first disc 127. A person of ordinary skill in the art will understand that the shaft 126 may comprise two separate shafts of equivalent diameter or two separate shafts with differing diameter, as well as separate portions of the same shaft as illustrated. As the first disc 127 and the second disc 120 turn with the activation or deactivation of the at least one electromagnet 122 proximate to each disc, the shaft 126 also turns. In the illustrated embodiment, the shaft 126 turns the first pulley 151 which turns the second pulley 152 through belt 153. As described above this allows the generator 150 to generate electricity to operate the at least one electromagnet 122 of the motor 100. A person of ordinary skill in the art will understand that the means through which the generator 150 is coupled to the motor 100 may vary to accommodate the most efficient operation of the system.

In operation, the at least one electromagnet 122 is preferably activated to generate an electromagnetic field, controllable via the solid state relay 130 responsive to a signal received from the sensing means 125 (FIGS. 2 and 3) responsive, e.g., to the position of a stub, photocell reflector, or the like, the electromagnetic field being thereby oriented to attract each respective at least one permanent magnet 121 as it approaches the at least one electromagnet 122, and/or alternatively to repel each respective at least one permanent magnet 121 as it moves away from the at least one electromagnet 122, thereby inducing rotation in the first disc 127, the second disc 120, and hence the shaft 126 of the motor 100, and to any load coupled to the shaft 126, including, preferably, the generator 150 for supplying electrical power to re-charge the battery 140. A person of ordinary skill in the art will understand that the motor 100 may be operated entirely in a "push" mode where the at least one electromagnet 122 is aligned with like poles to the at least one permanent magnet 121, a "pull" mode where the at least one electromagnet 122 is aligned with opposite poles to the at least one permanent magnet 121, or a "push/pull" mode where the pole of the at least one electromagnet 122 is switched to both push the at least one permanent magnet 121 and pull the at least one permanent magnet 121 as the first disc 127 and the second disc 120 turn.

Preferably, the first disc 127 and the second disc 120 are operable as flywheels, storing rotational inertial energy as each is turned by the magnetic forces of the at least one permanent magnet 121 and the at least one electromagnet 122, thereby providing for enhanced stability in the rotation of the discs, which rotation is less susceptible to variations in any load (not shown) driven by the motor 100.

By the use of the present invention, vehicles and other loads may be operated with using costly fuel such as gasoline and/or diesel by utilizing a motor that efficiently recharges its fuel source supplemented with naturally occurring renewable energy sources.

It is understood that the present invention may take many forms and embodiments. Accordingly, several variations may be made in the foregoing without departing from the spirit or scope of the invention. For example, the number of magnets, electromagnets, and discs may all be varied in order to accommodate the motor's use. In addition, the disc may be made of more or less mass in order to generate additional inertial forces, and thus higher output torque at the shaft that is less susceptible to variations in load. Still further, net electrical power generated by the generator 150 may be supplemented by, for example, non-consumable means, such as a photovoltaic cell, geothermal energy creation, wind energy creation, or the like.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. An electromagnetic motor comprising:
   a frame;
   a shaft rotationally mounted to said frame;
   at least one disc mounted to said shaft;
   at least one permanent magnet mounted on said at least one disc off-center from said at least one disc;
   at least one electromagnet mounted to said frame in magnetic proximity to said at least one permanent magnet, said at least one electromagnet and said at least one permanent magnet being substantially radially equidistant from said shaft;
   a battery coupled to said at least one electromagnet;
   a switch for controlling electrical power between said battery and said at least one electromagnet;
   sensing means for generating a signal to said switch to activate electrical power to said at least one electromagnet upon sensing when said at least one electromagnet is positioned with respect to said at least one permanent magnet such that a magnetic force generated by said electromagnet with respect to said at least one permanent magnet would be effective for inducing rotation of said at least one disc; and
   a generator mechanically coupled to said shaft and electrically coupled to said battery for generating electrical power to said battery.

2. The motor of claim 1, wherein said at least one disc comprises a flywheel.

3. The motor of claim 1, wherein said at least one permanent magnet comprises a surface which is flush with a surface of said at least one disc.

4. The motor of claim 1 further comprising:
   said at least one permanent magnet comprises a plurality of permanent magnets mounted on said at least one disc off-center from said at least one disc in an even distribution; and
   said at least one electromagnet comprises a plurality of electromagnets each placed in magnetic proximity to at least one of said plurality of permanent magnets.

5. The motor of claim 1, wherein said sensing means for generating a signal comprises:
   a firing ring mounted on a surface of said at least one disc, said firing ring having a surface defining at least one discontinuity corresponding to said at least one permanent magnet;
   a proximity sensor coupled to said sensing means and positioned on said frame for detecting said at least one discontinuity of said firing ring, and for generating a signal to said sensing means upon detection of said at least one discontinuity, said sensing means being configured for controlling electrical power to said at least one electromagnet in response to receipt of said signal from said proximity sensor causing said electromagnet to exert a magnetic force on said at least one permanent magnet.

6. The motor of claim 1, wherein said switch for controlling electrical power comprises a solid state relay.

7. The motor of claim 1 further comprising means for converting the rotational inertia of said at least one disc into mechanical power, said means mechanically coupled to said at least one disc.

8. The motor of claim 1 further comprising a brake mechanism to bias said at least one disc when stopped to a preselected position with respect to said at least one electromagnet to enhance subsequent starting of the motor.

9. The motor of claim 1 further comprising a photovoltaic cell electrically coupled to said battery for providing a supplemental source of electrical power.

10. The motor of claim 1, wherein said at least one disc comprises at least two discs mounted on a common shaft for synchronous rotation.

11. A method for generating mechanical power comprising the steps of:
   providing a frame;
   rotationally mounting a shaft to said frame;
   mounting at least one disc to said shaft;
   mounting at least one permanent magnet on said at least one disc off-center from said at least one disc;
   mounting at least one electromagnet to said frame in magnetic proximity to said at least one permanent magnet, said at least one electromagnet and said at least one permanent magnet being substantially radially equidistant from said shaft;
   coupling a battery to said at least one electromagnet;
   providing a switch for controlling electrical power between said battery and said at least one electromagnet;
   providing a sensing means for generating a signal to said switch to activate electrical power to said at least one electromagnet upon sensing when said at least one electromagnet is positioned with respect to said at least one permanent magnet such that a magnetic force generated by said at least one electromagnet with respect to said at least one permanent magnet would be effective for inducing rotation of said at least one disc;

activating said sensing means for controlling said switch causing said at least one electromagnet to exert a magnetic force on said at least one permanent magnet causing said at least one disc to rotate; and mechanically coupling a generator to said shaft and electrically coupling said generator to said battery for generating electrical power to said battery.

12. The method of claim 11, wherein providing said at least one disc comprises providing a flywheel.

13. The method of claim 11, wherein mounting said at least one permanent magnet on said at least one disc off-center from said at least one disc comprises recessing said at least one permanent magnet on said at least one disc such that a surface of said at least one permanent magnet is flush with a surface of said at least one disc.

14. The method of claim 11, further comprising the steps of:

providing a plurality of permanent magnets mounted on said at least one disc off center from said at least one disc in an even distribution; and providing a plurality of electromagnets each placed in magnetic proximity to at least one of said plurality of permanent magnets.

15. The method of claim 11, wherein providing said sensing means for generating a signal comprises:

mounting a firing ring on a surface of said at least one disc, said firing ring having a surface defining at least one discontinuity corresponding to said at least one permanent magnet;

mounting a proximity sensor on said frame and coupled to said sensing means for detecting said at least one discontinuity of said firing ring, and for generating a signal to said sensing means upon detection of said at least one discontinuity, said sensing means being configured for controlling electrical power to said at least one electromagnet in response to receipt of said signal from said proximity sensor causing said at least one electromagnet to exert a magnetic force on said at least one permanent.

16. The method of claim 11, wherein providing said switch for controlling electrical power comprises providing a solid state relay.

17. The method of claim 11, further comprising providing a means for converting the rotational inertia of said at least one disc into mechanical power, and mechanically coupling said means to said at least one disc.

18. The method of claim 11, further comprising coupling a brake mechanism to bias said at least one disc when stopped to a preselected position with respect to said electromagnet to enhance subsequent starting of the motor.

19. The method of claim 11, further comprising the step of electrically coupling a photovoltaic cell to said battery for generating supplemental electrical power.

20. The method of claim 11 wherein said at least on disc comprises at least two discs mounted on a common shaft for synchronous rotation.

\* \* \* \* \*